(12) United States Patent
Yaegashi

(10) Patent No.: US 6,453,731 B1
(45) Date of Patent: Sep. 24, 2002

(54) FUEL CONSUMPTION DISPLAY SYSTEM AND METHOD FOR VEHICLES

(75) Inventor: Hiroyasu Yaegashi, Kanagawa-ken (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/476,998

(22) Filed: Jan. 4, 2000

(30) Foreign Application Priority Data

Jan. 7, 1999 (JP) ............................................ 11-002168

(51) Int. Cl.$^7$ ................................................. G01L 3/26
(52) U.S. Cl. ......................................................... 73/113
(58) Field of Search ................... 73/113, 114; 374/142, 374/143; 283/74, 79, 115

(56) References Cited

U.S. PATENT DOCUMENTS

| | | | |
|---|---|---|---|
| 4,564,905 A | | 1/1986 | Masuda et al. |
| 4,570,226 A | | 2/1986 | Aussedat |
| 4,845,630 A | * | 7/1989 | Stephens ..................... 73/113 |
| 5,301,113 A | * | 4/1994 | To et al. ....................... 73/113 |
| 5,693,876 A | | 12/1997 | Ghitea, Jr. et al. |

FOREIGN PATENT DOCUMENTS

| | | |
|---|---|---|
| DE | 3936373 A1 | 5/1991 |
| DE | 19612062 A1 | 10/1997 |

OTHER PUBLICATIONS

Nissan Motor Co. "Introduction to new model cars P11–3", P11 series, p. 3, Dec. 1999.*

"Introduction to new model cars P11–3", P11 series (supplemented version III), F009871, Nissan Motor Co.).

"An Integrated Fiber Optic System for Dynamic Light Scattering Measurements in Micorgravity" by Rafat R. Ansari, SPIE vol. 2210/211 Published 1994 Meeting Date: Apr. 17–Apr. 22, 1994.

* cited by examiner

Primary Examiner—Benjamin R. Fuller
Assistant Examiner—Maurice Stevens
(74) Attorney, Agent, or Firm—McDermott, Will & Emery

(57) ABSTRACT

A short-term fuel consumption (A) and a longer-term fuel consumption (B) or corrected longer-term fuel consumption (C) are calculated in a common quantitative unit, and comparatively indicated on a display (2), respectively by a bar graph (20) and a level pointer (211) having a graduated scale common thereto, visually aiding a decision by comparison therebetween.

16 Claims, 9 Drawing Sheets

FUEL CONSUMPTION DISPLAY SYSTEM AND METHOD FOR VEHICLES

BACKGROUND OF THE INVENTION

The present invention relates to a fuel consumption display system for vehicles that displays different kinds of fuel consumption, and to an associated fuel consumption display method.

A car navigation system with a function for displaying vehicular information such as fuel consumption information is known ("Introduction to new model cars P11-3, P11 series (supplemented version III) F009871, Nissan Motor Co.).

This system has a fuel consumption display screen, which displays information of different kinds of fuel consumption. Specifically, a temporary (i.e. short-term) fuel consumption of a traveling vehicle at the current time is displayed by a bar graph, and a (longer-term) average fuel consumption from a startup of the engine for the travel to the current time is displayed in numeric value. The average fuel consumption is provided to the driver of the vehicle as a reference for use in determining whether or not the temporary fuel consumption is acceptable.

SUMMARY OF THE INVENTION

The temporary fuel consumption varies in response to variations in the running condition of the vehicle.

The vehicle operator visually discriminates a varying state of the temporary fuel consumption from the bar graph, reads a numeric display of the average fuel consumption, and makes a decision by comparison on the relative magnitude therebetween as, to reason that the current fuel consumption is acceptable.

While the reasoning itself is not difficult, it does require the driver to use power of thinking for making the decision by a quantitative comparison between different kinds of fuel consumption.

Accordingly, and in consideration of the foregoing, it is an object of the invention to provide a fuel consumption display system and a fuel consumption display method that can effectively support in low-cost a vehicle operator making a quantitative comparison between different kinds of fuel consumption.

To achieve this object, one aspect of the invention is a fuel consumption display system for vehicles, the system comprising an operator which calculates different kinds of fuel consumption in a common quantitative unit, and a display which visually and simultaneously displays by a common scale factor the different kinds of fuel consumption calculated by the operator.

According to this aspect of the invention, different kinds of fuel consumption are calculated in a common quantitative unit, and are visually and simultaneously displayed by using a scale factor common therebetween.

Accordingly, the vehicle operator is allowed to arrive at a decision result equivalent to that achieved by careful thought, by merely making a visual comparison between the displayed different kinds of fuel consumption, without the need to be concerned with making a quantitative comparison between the different kinds of fuel consumption.

The vehicle operator can thus be effectively aided in making a quantitative comparison of different kinds of fuel consumption. In addition, a reduction in cost can be accrued by a possible sharing of display elements.

The invention can also achieve the object as a fuel consumption display method for vehicles comprising calculating different kinds of fuel consumption in a common quantitative unit, and visually and simultaneously displaying by a common scale factor the different kinds of fuel consumption calculated.

BRIEF DESCRIPTION OF THE DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
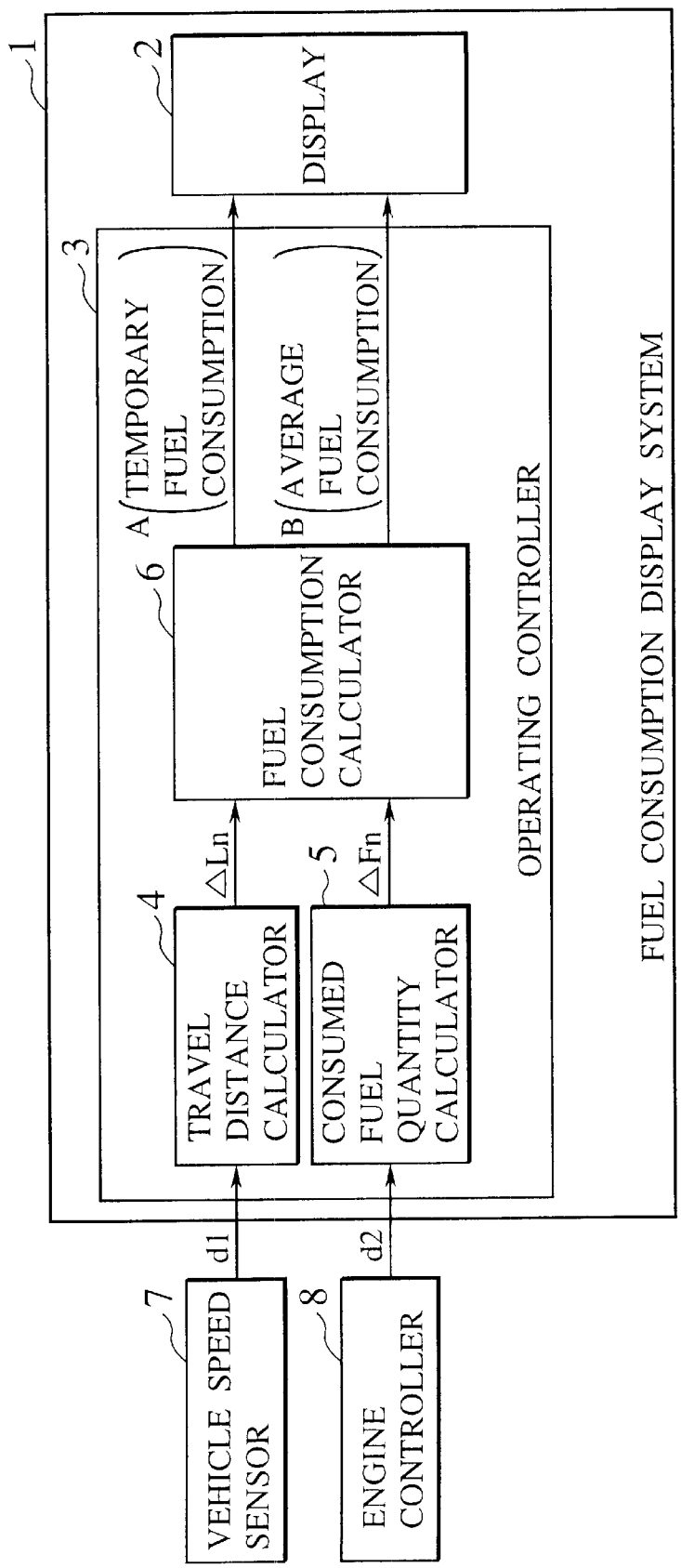
FIG. 1 is a block diagram of a fuel consumption display system for vehicles according to an embodiment of the invention.

Details of the present invention are presented below, with reference to the accompanying drawings, in which corresponding elements are assigned the same reference characters.

Figure 2A:
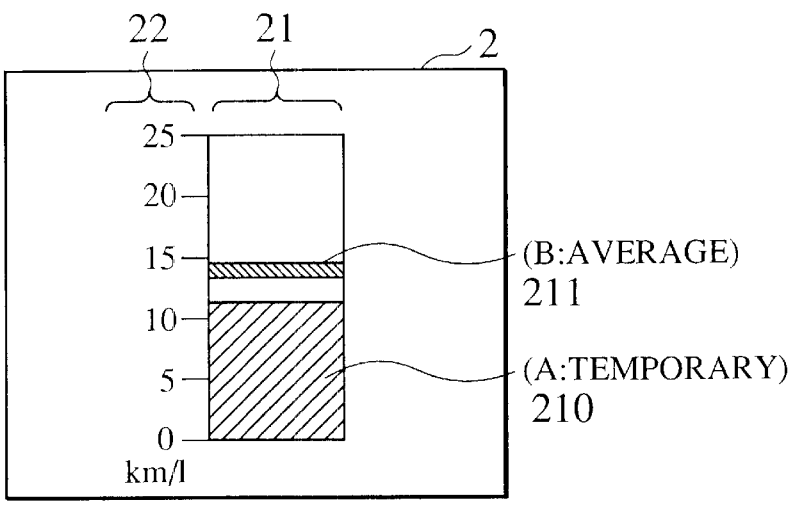
FIG. 2A is a front view of a display of the fuel consumption display system of FIG. 1, and FIGS. 2B and 2C are enlarged partial views thereof.
Figure 2B:
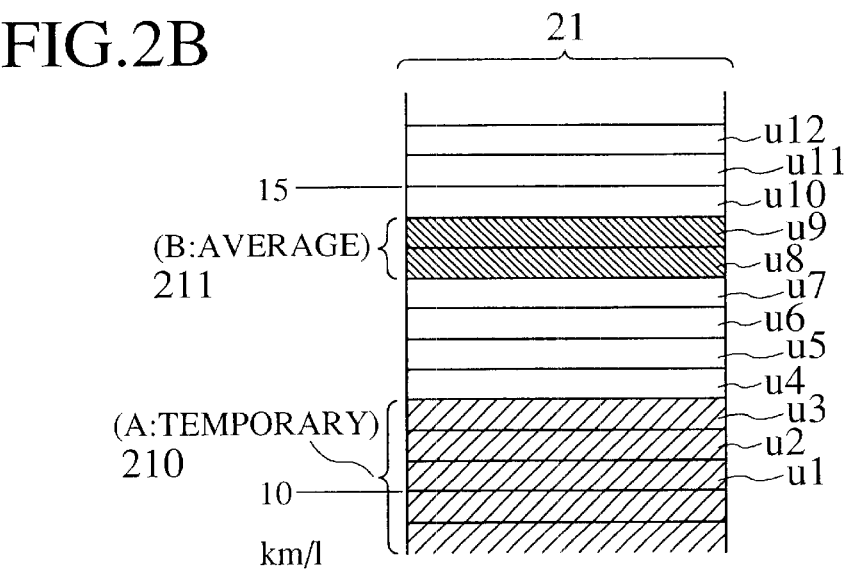
Figure 2C:
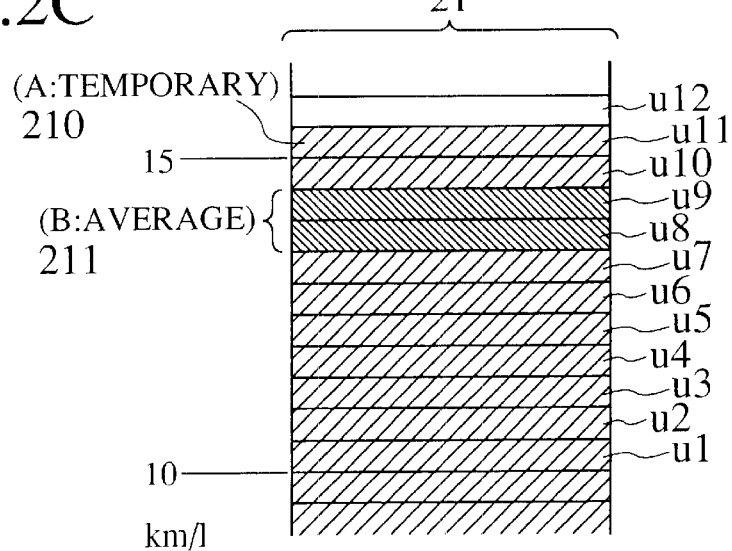

FIG. 1 shows a fuel consumption display system 1 according to a first embodiment of the invention, and FIG. 2A to FIG. 2C show a display 2 displaying different kinds of fuel consumption calculated by an operating controller (hereinafter simply referred to as the controller) 3 of the fuel consumption display system 1.

The fuel consumption display system 1 is constituted with the controller 3 and the display 2, and has a vehicle speed sensor 7 and an engine controller 8 each as a source of data for calculation operation. The display 2 is arranged in place in a vehicle in which the system 1 is installed, to be convenient for observation by the driver, for example, on the instrument panel of the vehicle. The data source may be an information source adapted to output later-described data or representative data. In the embodiment, the engine controller 8 includes a control system for controlling the injection rates of a plurality of fuel injection valves so as to achieve an optimum air-fuel ratio in response to travelling conditions. Alternately, there may be employed any control element that constantly monitors the fuel injection condition of the vehicular engine.

In addition to performing overall control of the fuel consumption display system 1, the controller 3 calculates two different kinds of fuel consumption: one as average fuel consumption in terms of a series B of "averages $B_i$ (where i=1, 2, ..., n) of fuel consumption during successively wider time regions of interest from the last startup of the engine" (hereinafter sometimes referred to as "average fuel consumptions"), such that B={$B_1, B_2, ..., B_n$: hereinafter sometimes collectively expressed by B}; and the other as temporary or short-term fuel consumption in terms of a series A of "measures or averages $A_i$ each taken within an associated narrow time region of interest" (hereinafter sometimes referred to as "temporary fuel consumptions"), such that A={$A_1, A_2, ..., A_n$: hereinafter sometimes collectively expressed by A}, both (A and B) in a common quantitative unit in terms of a traveled distance (for example, kilometers) per unit quantity (for example, liter) of consumed fuel.

At the display 2, the temporary and average fuel consumptions A and B calculated by the controller 3 are continuously displayed in their colors on display regions therefor overlapping each other in a common screen, such that they are scaled by a common scale factor (in terms of a graduation spacing, for example, mm, per unit fuel consumption, for example, liters/km, in this case), to be simultaneously and visually indicated. The driver of the vehicle can view the indicated average fuel consumption B as a target fuel consumption directly comparable with the indicated temporary fuel consumption A, and is thus able to drive the vehicle so that the temporary fuel consumption A approaches the target fuel consumption B. It is also possible to provide an explicit indication on the display 2 that the average fuel consumption B is a target fuel consumption.

The controller 3 is constituted with a CPU, a memory, peripheral devices, a power supply, and an interface with other devices. The memory has operation and control programs stored therein, which are executed by the CPU so as to implement processing functions detailed herein.

The operation and control programs include a "set of programs 4 for calculating the distance traveled by the vehicle" (hereinafter referred to as "travel distance calculator"), a "set of programs 5 for calculating the quantity of fuel consumed" (hereinafter referred to as "fuel quantity calculator"), and a "set of programs for calculating the average and temporary fuel consumptions" (hereinafter referred to as "fuel consumption calculator").

As the controller 3 recognizes a series of increments of lapsed time {$\Delta T_i$}={$\Delta T_1$ (initial time interval after the engine start), $\Delta T_2, \Delta T_3, ..., \Delta T_n$ (current time interval): hereinafter sometimes collectively expressed by $\Delta T$}, the travel distance calculator 4 is adapted for processing at a respective current increments $\Delta T_n$ of time (for example, 0.1 s) a current vehicle speed data d1 input from the vehicle speed sensor 7 (for example, wheel revolutions per second or a corresponding pulse count per second), using a process in which the vehicle speed is assumed to be constant during the interval $\Delta T_n$, for example, to calculate an increment $\Delta L_n$ in travel distance as an absolute traveled distance, such that:

$$\Delta L_n = d1 \times \Delta T_n \times K1 \qquad \text{(Expression 1)},$$

where K1 is a conversion factor appropriate to the definition of the vehicle speed d1.

There is resulted a series {$\Delta L_i$} of increments $\Delta L_i$ of distance traveled by the vehicle, such that {$\Delta L_i$}={$\Delta L_1$ (distance traveled in the initial time interval), $\Delta L_2, \Delta L_3, ..., \Delta L_n$ (distance traveled in the current time interval): hereinafter sometimes collectively expressed by $\Delta L$}, which is stored in the memory as necessary.

The fuel quantity calculator 5 is adapted at a respective current time interval $\Delta T_n$ for processing a current fuel injection data input from the engine controller 8 (for example, a corresponding total count number $P_n$ of pulse signals employed for driving fuel injectors at whole cylinders of the engine), using a process in which the count number is assumed to be constant during the interval $\Delta T_n$, to calculate a corresponding increment $\Delta F_n$ of consumed fuel quantity, such that:

$$\Delta F_n = Q \times P_n \times K2 \qquad \text{(Expression 2)},$$

where Q is the fuel flow rate when a respective cylinder at a respective cylinder of the engine is fully opened for one second for example, and K2 is a correction factor appropriate to the definition of the fuel injection data d2.

There is resulted a series {$\Delta F_i$} of increments $\Delta F_i$ of the quantity of fuel consumed by the vehicle, such that {$\Delta F_i$}={$\Delta F_1$ (fuel consumed in the initial time interval), $\Delta F_2, \Delta F_3, ..., \Delta F_n$ (fuel consumed in the current time interval): hereinafter sometimes collectively expressed by $\Delta F$}, which is stored in the memory as necessary. If the engine controller 8 is monitoring time variations of the quantity of injected fuel, a fuel consumption increment series {$\Delta F_i$} may preferably be constituted with fuel injection data d2 successively input from the engine controller 8, by means of data transfer between synchronized CPUs or the use of a common CPU.

The fuel consumption calculator 6 divides a respective one of traveled distance increments $\Delta L_n$ successively input from the travel distance calculator 4 by a corresponding one of fuel consumption quantities $\Delta F_n$ successively input from the fuel quantity calculator 5, to calculate the temporary fuel consumption $A_n$ at each current time ($\Delta T_n$), such that:

$$A_n = \Delta L_n / \Delta F_n \qquad \text{(Expression 3)}.$$

On the other hand, the fuel consumption calculator 6 calculates a successive sum $\Sigma_n(\Delta L_i)$ of the series {$\Delta L_i$} of increments $\Delta L_i$ of traveled distance, such that $$\sum_n (\Delta L_i) = \Delta L_n + \sum_{n-1} (\Delta L_i) = \Delta L_n + \Delta L_{n-1} + \ldots + \Delta L_2 + \Delta L_1,$$

and a successive sum $\Sigma_n(\Delta F_i)$ of the series {$\Delta F_i$} of increments $\Delta F_i$ of consumed fuel quantity, such that $$\sum_n (\Delta F_i) = \Delta F_n + \sum_{n-1} (\Delta F_i) = \Delta F_n + \Delta F_{n-1} + \ldots + \Delta F_2 + \Delta F_1,$$

and divides that sum $\Sigma_n(\Delta L_i)$ by this sum $\Sigma_n(\Delta F_i)$ to calculate the average fuel consumption $B_n$ at each current time ($\Delta T_n$), such that:

$$B_n = \Sigma_n(\Delta L_i)/\Sigma_n(\Delta F_i) \qquad \text{(Expression 4)}.$$

As shown in FIG. 2A, the display has at a central portion thereof a display region 21 constituted with liquid-crystal display elements for displaying a vertically varying bar graph 210 that represents the temporary fuel consumption A. This region 21 also serves as a display region for a level pointer 211 to indicate the average fuel consumption B usable as a target fuel consumption, and has at a left edge part thereof a graduated scale 22 serving as a shared fuel consumption index. The graduated scale 22 has its measuring unit in terms of kilometers/liter (km/l on the display) and a unit length defined as a dimension (in millimeters) representing the measuring unit times a specified scale factor (mm/km/liter), and graduation lines are displayed or otherwise marked therealong at a spacing interval equivalent to the unit length times five, so that a respective graduation line represents a corresponding multiple of 5 in terms of the measuring unit of kilometers/liter.

FIG. 2B illustrates an intermediate part of the display region 21, covering graduation lines of 10 kilometers/litter and 15 kilometers/liter. Adjacent graduation lines in the display region 21 has therebetween a column of ten unitary display rows each corresponding in height to 0.5 kilometers/liter (for example, rows u1 to u1 between 10 km/l and 15 km/l graduation lines, and rows u11, u12 and so on above the 15 km/l graduation line). Each display row is constituted with a multiplicity of liquid-crystal pixels. These pixels are controlled from the controller so that a visual distinction is made between the bar graph and the level pointer, by means of a difference in brightness, pattern, or color coding therebetween, to render the level pointer conspicuous when it is overlapped with the bar graph. An overlapping state may be visually highlighted, or informed to the driver by a visual or acoustic sign. It is noted that a respective display row may be constituted with one or more LEDs (light emitting diodes).

Color-coding can be achieved, for example, by displaying the bar-graph display 210 indicating the temporary fuel consumption green and displaying the level pointer 211 indicating the average fuel consumption read. In the example shown in FIG. 2B, display rows u3 and therebelow, which indicate the bar graph 210, are displayed green, while thee display rows u8 and u9, which indicate the level pointer 211, are displayed red. In the example of FIG. 2B, the temporary fuel consumption A (11.5 km/l) is lower than the average fuel consumption B (14.5 km/l). However, in the case of FIG. 2C, the temporary fuel consumption A (15.5 km/l) is higher than the average fuel consumption B (14.5 km/l), so that the displays thereof overlap. In this case, therefore, the display rows u8 and u9 are displayed red, and display rows u11 and therebelow are displayed green.

According to this embodiment, because the temporary fuel consumption A and the average fuel consumption B are visually and simultaneously displayed in an overlapped fashion in the display region 21 with a common scale factor 22, it is possible to instantaneously judge the relative magnitude of the fuel consumptions A and B by merely checking whether or not the bar graph 210 exceeds the position of the level pointer 211. It is also possible to numerically indicate the average fuel consumption B on the display 2, thereby informing an absolute value.

Figure 3A:
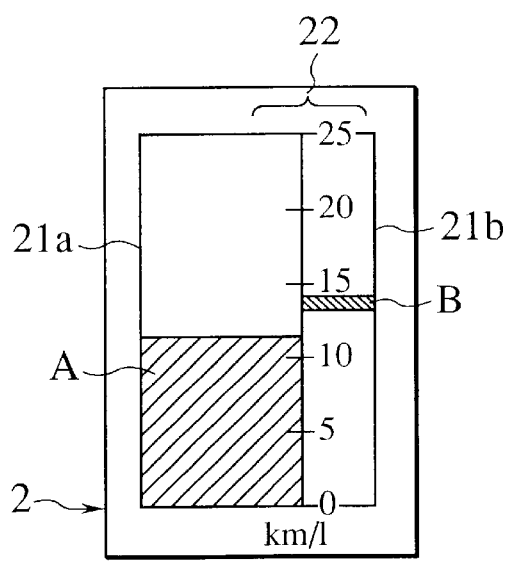
FIG. 3A and FIG. 3B are front views of displays according to modifications of the display of FIG. 2, respectively.
Figure 3B:
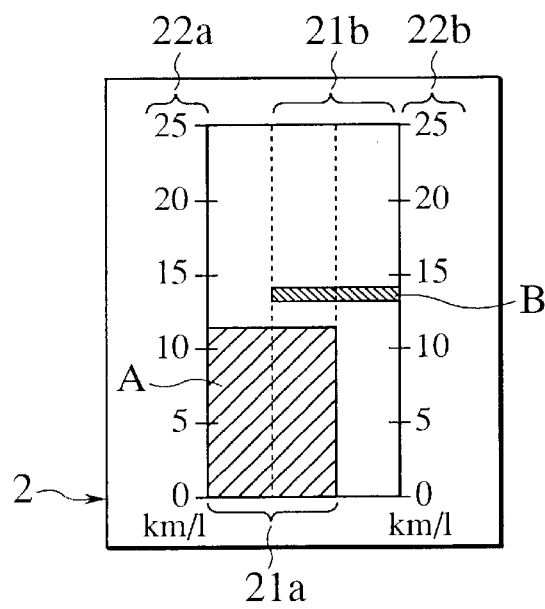

Although this embodiment is described for the case in which a graduated scale 22 is shared between temporary fuel consumption A and comparative fuel consumption B to be displayed on an overlapping display region 21, it is possible to adequately adopt other methods of simultaneously providing visual displays using a common same scale factor, as exemplarily shown in FIG. 3A and FIG. 3B.

FIG. 3A illustrates a modification in which a display 2 has a left region 21a for indicating a temporary fuel consumption A and a right region 21b for indicating a comparative fuel consumption B, the left and right regions 21a and 21b being disposed to either side of and separated by a common graduated scale 22. FIG. 3B illustrates a modification in which a display 2 has a left region 21a for indicating a temporary fuel consumption A and a right region 21b for indicating a comparative fuel consumption B, the left and right regions 21a and 21b partially overlapping one another, and a pair of graduated scales 22a and 22b provided separately for the left and right display regions. These graduated scales 22a and 22b have a common scale factor, as well as a common reference point (0 km/l).

It will be understood that how to display fuel consumptions A and B is not limited to the foregoing examples. They can be each indicated by a bar graph, level pointer, line graph, circular graph, image, or character, or by any other applicable implementation. As long as a common scale factor is employed, it is not necessary to display an entirety nor even part of a graduated scale or scales. While it is preferable that the scaling direction of the fuel consumptions A and B be the same, it is possible to use different scaling directions, so long as it is possible to perform a visual comparison therebetween, and as a sense of displayed change is common to the fuel consumptions. It should also be noted that the updating period for the average fuel consumption B used as a comparative reference need not to be the same as and can be made larger than the updating period for the temporary fuel consumption A.

Although arbitrary time intervals $\Delta T_i$ and $\Delta T_j$ (where $i \neq j$) should be equivalent to each other (i.e. $\Delta T_i = \Delta T_j$) as a rule, it is alternately possible, depending upon the specificity of suffix "i" (for example, i=1 or n), the relationship between suffixes "i" and "j" (for example, i<i'(a number corresponding to a prescribed time after engine startup)<j), or the traveling condition (for example i for a high speed and j for a low speed), to make settings such that $\Delta T_i \neq \Delta T_j$. For example, it is possible to make settings of $\Delta T_1 >> \Delta T_n$, $\Delta T_i = \Delta T_{i'} > \Delta T_j$, or $\Delta T_{i(high\ speed)} < \Delta T_{j(low\ speed)}$.

In this embodiment, in a case where the average fuel consumption B is based on a time period of interest of which the most part is occupied by a highway driving to be good in fuel consumption, if that fuel consumption B is directly compared with the temporary fuel consumption A when driving over normal roads, the user would perform a comparative decision on the acceptability of this fuel consumption A in consideration of the previous traveling history, thus insufficiently making use of an aid of the fuel consumption display system described. Another embodiment of the invention, to be described below, provides effective support for making a comparative decision in consideration of a traveling history or traveling conditions.

Figure 4:
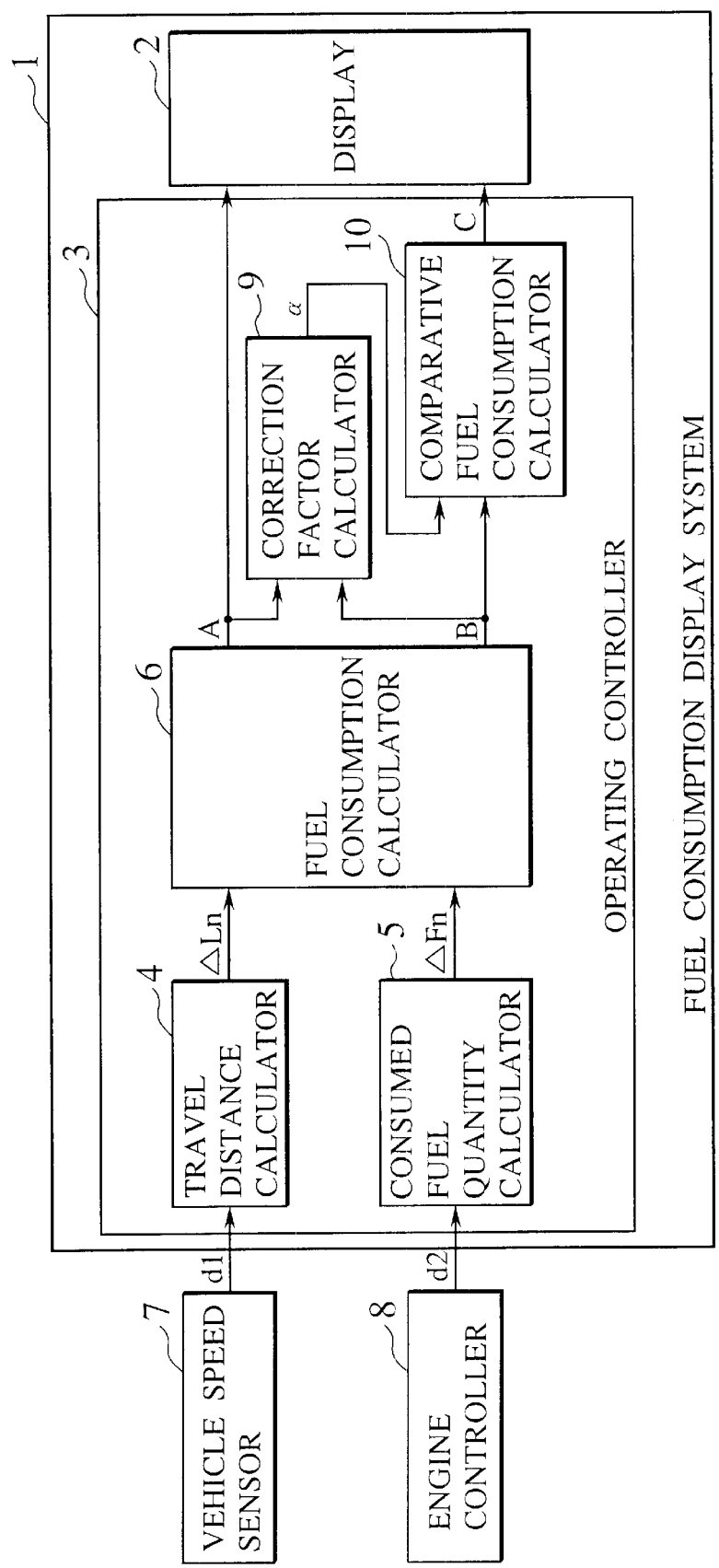
FIG. 4 is a block diagram of a fuel consumption display system for vehicles according to another embodiment of the invention.

FIG. 4 shows a fuel consumption display system 1 according to a second embodiment of the invention. In this embodiment, as in the first embodiment, the traveled distance increments $\Delta L$ and fuel consumption increments $\Delta F$ are calculated based on data d1 and d2 from a vehicle speed sensor 7 and an engine controller 8, and the results of these calculations are used as the basis for calculating the temporary fuel consumption A and the average fuel consumption B.

In the second embodiment, however, the average fuel consumption B is corrected using a correction factor, and the corrected fuel consumption is displayed as a comparative fuel consumption $C = \{C_1, C_2, \ldots, C_n:$ hereinafter sometimes collectively expressed by $C\}$ to be targeted. Specifically, a correction factor calculator 9, in the form of a set of programs, uses a method described below to determine the correction factors $\alpha = \{\alpha_1, \alpha_2, \ldots, \alpha_n:$ hereinafter sometimes collectively expressed by $\alpha\}$, in response to the relationship between the temporary fuel consumption $A_n$ and the average fuel consumption $B_n$ at each current time ($\Delta T_n$), and a comparative fuel consumption calculator 10 implemented as a program set determines corresponding comparative fuel consumptions $C_n$ by multiplying the average fuel consumptions $B_n$ by the correction factors $\alpha_n$, i.e. $C_n = B_n \times \alpha_n$. The comparative fuel consumption C and the temporary fuel consumption A are indicated on the display 2 using the same type of display mode described with regard to the first embodiment, in which display the temporary fuel consumption A is indicated by a bar graph and the comparative fuel consumption C is indicated by a level pointer, so that their magnitudes are visually perceived comparable on a common graduated scale.

Letting $\beta$ be a given or selective positive constant $\beta^+$ (e.g. $\beta^+=0.1$) as an operator to be added or subtracted, or be a null operator $\beta^0$ having a post-acting operator $\beta^-$ for canceling a result of an operation of the constant operator $\beta^+$ (i.e., $\beta^0=\beta^++\beta^-=0$), the correction factor $\alpha_n$ is determined such that:

if $A>B$, then $\alpha_n=\alpha_{n-1}+\beta$     (Expression 5), where $\beta=\beta^+$ for $\alpha_n<\alpha_{max}$, and $\beta$ acts as $\beta^0$ when $\beta_n \geq \alpha_{max}$, where $\alpha_{max}$ is a predetermined upper limit (e.g., $\alpha_{max}=1.2$);

if $A=B$, then $\alpha_n=1$     (Expression 6);

and if $A<B$, then $\alpha_n=\alpha_{n-1}-\beta$     (Expression 7), where $\beta=\beta^+$ for $\alpha_n>\alpha_{min}$, and $\beta$ acts as $\beta^0$ when $\alpha_n \leq \alpha_{min}$, where $\alpha_{min}$ is a predetermined lower limit (e.g., $\alpha_{min}=0.8$).

Therefore, the comparative fuel consumption $C_n$ is related to the average fuel consumption B as follows.

$B_n \cdot \alpha_{min} < C_n < B_n \cdot \alpha_{max}$

The effect of this embodiment is as follows.

In the case in which the temporary fuel consumption A is better than the average fuel consumption B ($A_n>B_n$), which could occur when the driving switched from in-town roads to a highway, the comparative fuel consumption $C_n$ at the current time interval $\Delta T_n$ is constantly displayed as a value larger than the comparative fuel consumption $C_{n-1}$ for the preceding time interval $\Delta T_{n-1}$, thereby providing an easy-to-grasp target responsive to the switch to a favorable fuel consumption condition (highway driving), making it possible to instantly recognize the same comparison results that would have been made by the user by considering the traveling history.

If the temporary fuel consumption A is lower than the average fuel consumption B ($A_n<B_n$), which could occur when switching from highway driving to in-town roads, the current comparative fuel consumption $C_n$ is constantly displayed as a value that is smaller than the previous comparative fuel consumption $C_{n-1}$, the result again being a display that is quickly and easily recognizable as indicating the switch to the current running condition (in-town driving).

If the temporary fuel consumption A and average fuel consumption B are equal ($A_n=B_n$), the comparative fuel consumption $C_n$ provides an easy-to-grasp indication that the comparative fuel consumption is favorable.

Figure 5:
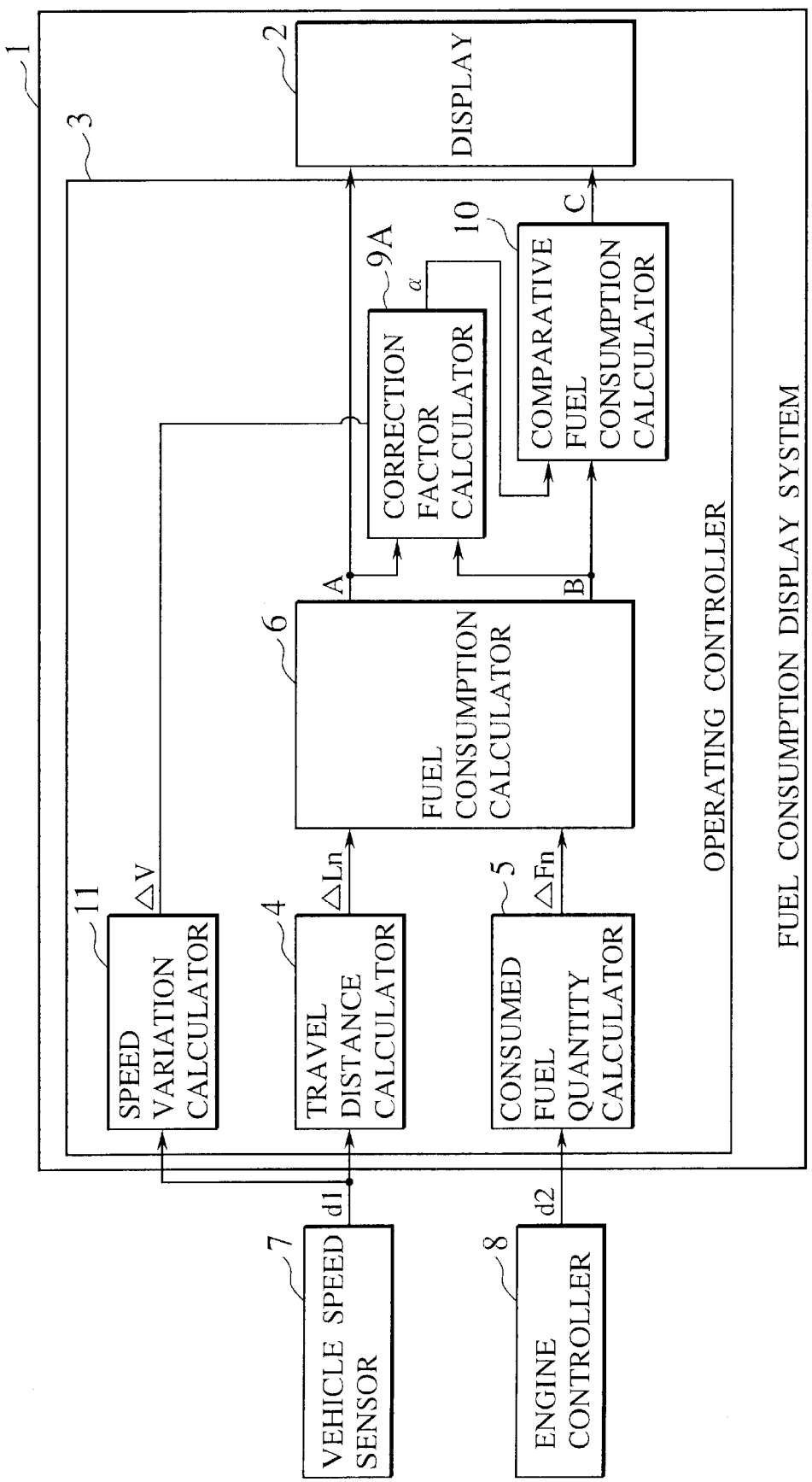
FIG. 5 is a block diagram of a fuel consumption display system for vehicles according to another embodiment of the invention.

FIG. 5 shows a fuel consumption display system 1 according to a third embodiment of the invention, in which the average fuel consumption B is corrected in response to relative magnitudes between the temporary fuel consumption A and the average fuel consumption B, and variations $\Delta V=\{\Delta V_1, \Delta V_2, \ldots, \Delta V_n$: hereinafter sometimes collectively expressed by $\Delta V\}$ of the vehicle speed $V=\{V_1, V_2, \ldots, V_n$: hereinafter sometimes collectively expressed by $V\}$, and a corrected average fuel consumption B is displayed as the comparative fuel consumption C.

In the third embodiment, a speed variation calculator, implemented as a program set, calculates the vehicle speed $V_n$ at each current time interval $\Delta T_n$, based on vehicle speed data d1 from the vehicle speed sensor 7, determines a speed ratio, for example, the ratio ($V_n/V_{n-1}$) of the current vehicle speed $V_n$ with respect to the previous vehicle speed $V_{n-1}$, and outputs this ratio as a vehicle speed variation (proportion) $\Delta V_n$ for the current time interval $\Delta T_n$, to a correction factor calculator 9A. The correction factor calculator 9A, implemented as a program set, calculates a correction factor $\alpha_n$, using a method to be described below, based on the temporary fuel consumption $A_n$ and average fuel consumption $B_n$ determined by the fuel consumption calculator 6 and on the vehicle speed variation $\Delta V_n$, and the calculated correction factor $\alpha_n$ is output to a comparative fuel consumption calculator 10, implemented as a program set, which multiplies the average fuel consumption $B_n$ by this correction factor $\alpha_n$ to obtain the comparative fuel consumption $C_n$ ($=B_n \times \alpha_n$). The calculation units for the fuel consumptions $A_n$, $B_n$, and $C_n$ are, of course, the same. Like the foregoing embodiments, the display 2 in the third embodiment indicates the temporary fuel consumption $A_n$ and the comparative fuel consumption $C_n$ by using a common scale factor.

Letting $\gamma$ be a given or selective reference or threshold value for vehicle speed variation $\Delta V$, the correction factor $\alpha_n$ can be calculated in response to the relative magnitudes of the temporary fuel consumption $A_n$ and the average fuel consumption $B_n$, for example, such that:

if $A_n<B_n$ and $\Delta V_n<\gamma$, then $\alpha_n=\alpha_{n-1}-\beta$     (Expression 8), where $\beta=\beta^+$ for $\alpha_n>\alpha_{min}$, and $\beta$ acts as $\beta^0$ when $\alpha_n<\alpha_{min}$; and if $A_n \geq B_n$ or $\Delta V_n \geq \gamma$, then $\alpha_n=_{n-1}+\beta$     (Expression 9), where $\beta=\beta^+$ for $\alpha_n<\alpha_{min}$, and $\beta$ acts as $\beta^0$ when $\alpha_n \leq \alpha_{max}$.

Because the dimension of the above-noted speed variation is that of acceleration, the condition "A<B and $\Delta V<\gamma$" of Expression 8 applies, for example, in the case in which a vehicle that had been traveling along a level road starts climbing a hill. By way of amplification, consider the case in which $A_i=B_i$ on a level road. When the vehicle starts to climb a hill and accelerates, as the temporary fuel consumption $A_j$ (where j>i) drops, $A_j<A_i=B_i \approx B_j$ (that is, A<B). Assume now that the rising hill is traveled with the same temporary fuel consumption $A_k=A_j$ (where k>j), that is, $A_k<B_k$ and engine output =constant. Because the output is constant when climbing the hill, the acceleration decreases as the potential energy increases, so that $\Delta V_k<\Delta V_j$. The value of $\Delta V_j$ is dependent upon a hypothetical upgrade of the hill, and if this is set to some appropriate value of $\gamma$, it so follows that $\Delta V_k<\gamma$, which meets the condition of Expression 8. This means that the value of $\alpha$ gradually decreases, with a commensurate decrease in the displayed value of the comparative fuel consumption C, meaning an approach to a relatively low value of temporary fuel consumption A. This is therefore an easy-to-understand visual indication that the driver is making an effort to achieve fuel economy in climbing a short hill with a relatively gentle gradient.

When the engine output is increased to achieve a sufficient vehicle acceleration while climbing a hill, even if the fuel consumption is $A_k<B_k$, the vehicle speed is $\Delta V_k>\gamma$, which meets the condition "$A \geq B$ or $\Delta V \geq \gamma$" of Expression 9. In this case, following Expression 9, there is a gradual increase in $\alpha$, with a commensurate increase in the displayed comparative fuel consumption C away from the relatively low temporary fuel consumption A. For this reason, as seen from a user who understands that a worsening of fuel consumption when climbing a hill is inevitable, this provides an easy-to-understand visual indication of the drop in fuel economy when climbing a relatively steep or long hill.

If the travel of the vehicle transitions from either running a flat road or climbing hill to descending a slope, although the speed variation will be $\Delta V<\gamma$ or $\Delta V \geq \gamma$, depending upon the degree of braking, because the temporary fuel consumption A exceeds the average fuel consumption B, the condition "$A \geq B$ or $\Delta V \geq \gamma$" of Expression 9 is satisfied, with a result such that, as the correction factor a gradually increases, there occurs a commensurate increase in the displayed comparative fuel consumption C, indicating an approach to a relative high value of temporary fuel consumption A. For this reason, the driver is provided with an easy-to-understand indication of impression that fuel economy is being restored.

In the foregoing description, it is preferable to provide a discriminator "Dis (X1, X2, ...)" for executing a discrimination to select gradually increasing the correction factor $\alpha_n$ (that is, $\alpha_n = \alpha_{n-1} + \beta$) or gradually decreasing the correction factor $\alpha_n$ (that is, $\alpha_n = \alpha_{n-1} - \gamma$), which discriminator may preferably be expanded in a general form having, besides described logical conditions or variants (for example, X1= $(A \geq B)$=1 (true) or 0 (false), X2=(A<B), X3=($\Delta V \geq \gamma$), X4= ($\Delta V_n < \gamma$), additional conditions or variants (for example, conditions related to fuel economy, such as for a comparison between the vehicle loading and a reference parameter, or for a comparison between the number of passengers and a reference parameter), to be executed by either the correction factor calculator 9A or the operating controller 3.

It is also possible to provide a parameter selector for manual selection of one or mokre parameters, such as $\alpha_{max}$, $\alpha_{min}$, $\beta^+$, and/or $\gamma$ in response to an expected path of the vehicle, or a parameter controller for an automatic setting based on the traveling history of the vehicle.

Figure 6:
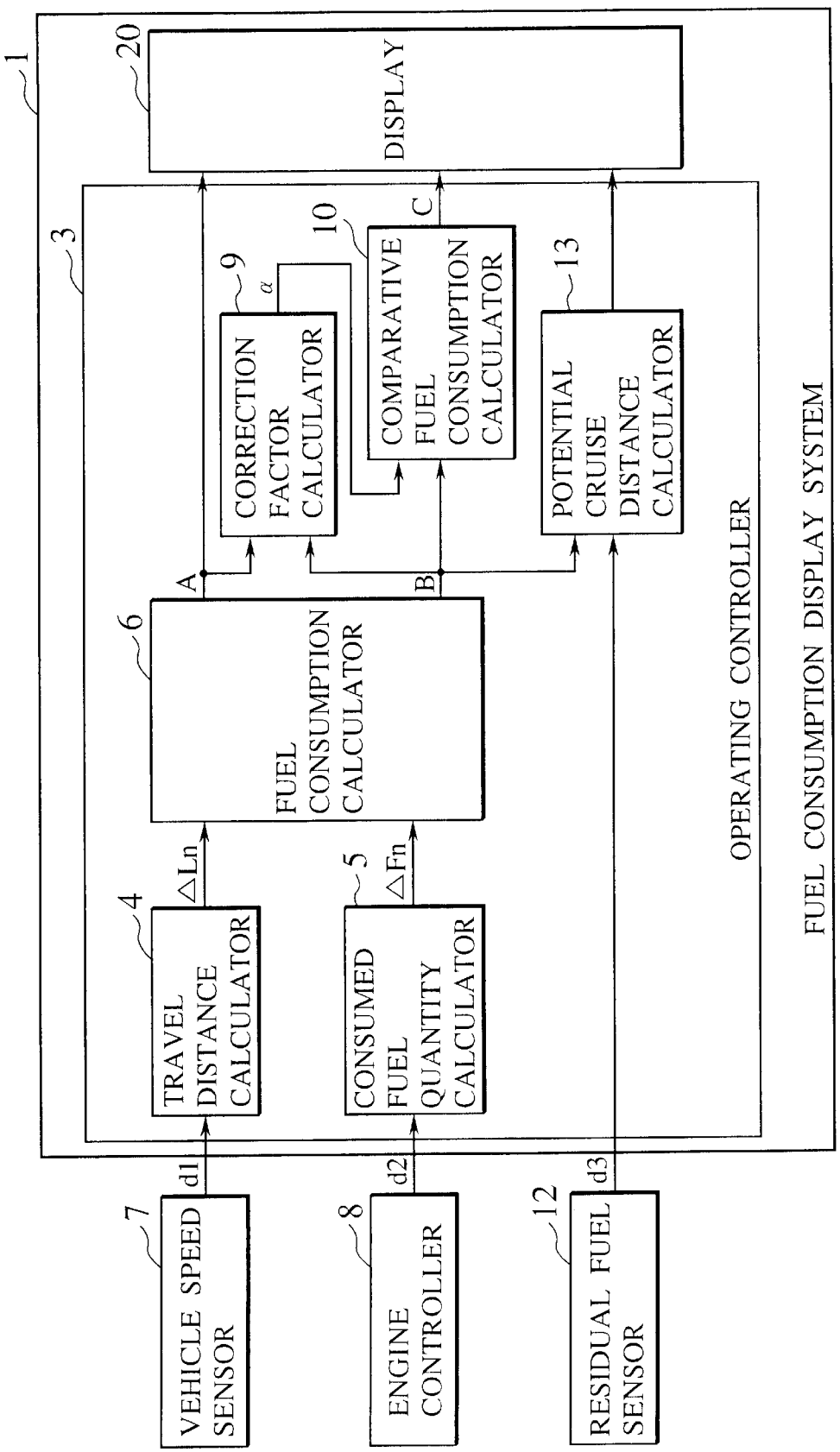
FIG. 6 is a block diagram of a fuel consumption display system for vehicles according to another embodiment of the invention.
Figure 7:
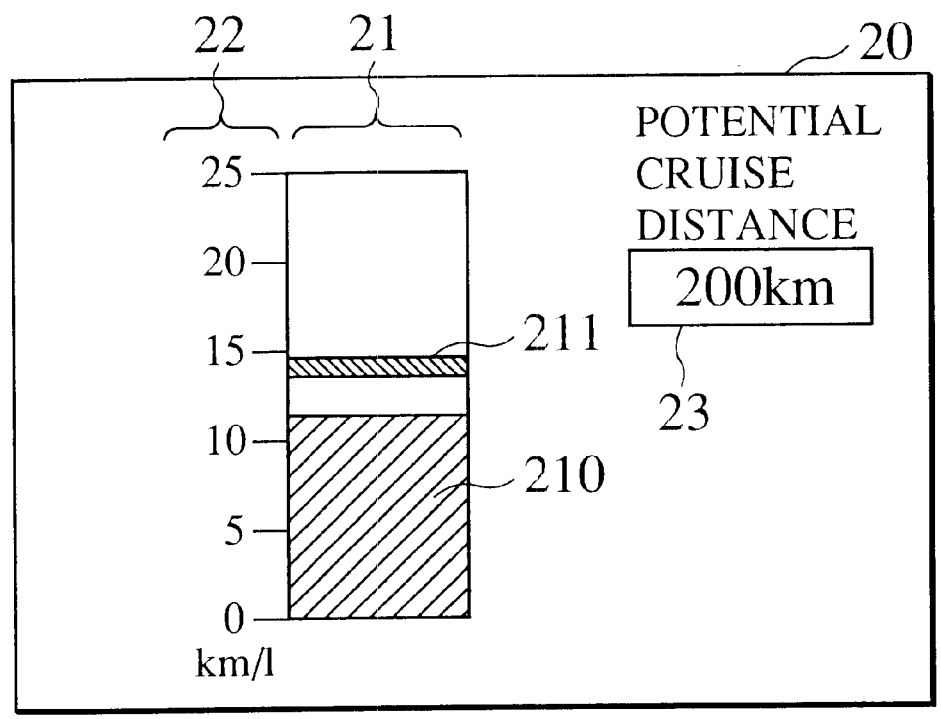
FIG. 7 is a front view of a display of the fuel consumption display system of FIG. 6.

FIG. 6 shows a fuel consumption display system 1 according to a fourth embodiment of the invention, of which a display 20 is illustrated in FIG. 7. In this fuel consumption display system 1, a fuel consumption calculator 6 is responsive to a traveled distance $\Delta Ln$ and a consumed fuel quantity $\Delta Fn$ calculated by a travel distance calculator 4 and a fuel quantity calculator 5, to calculate a temporary fuel consumption A for a narrow time period of interest, a long-term average fuel consumption E={$E_1, E_2, \ldots, E_n$: hereinafter sometimes collectively expressed by E}, and an intermediate-term average fuel consumption D={$D_1, D_2, \ldots, D_n$: hereinafter sometimes collectively expressed by D}. The intermediate average fuel consumption D and long-term fuel consumption E differ from each other in terms of how far back in time from the present time their averages are calculated. The long-term fuel consumption E covers a longer period of time (traveling time) than the intermediate-term fuel consumption D. Employing an expression for combination between the calculation time periods for the intermediate-term average fuel consumption D and the long-term average fuel consumption, such that (D, E), it is possible to make such settings as (D, E)=(10 km, 100 km), (10 minutes, 24 hours), (2 km, 24 hours), and (1 minute, 100 km). The long-term average fuel consumption E will sometimes be taken herein as an average fuel consumption (B) from the time the engine is started until the present time.

In the fourth embodiment, a correction factor calculator 9B is responsive to the intermediate-term average fuel consumption $D_n$ and long-term average fuel consumption $E_n$ calculated by the fuel consumption calculator 6 for a current time interval $\Delta T_n$, to calculate a correction factor $\alpha_n$ such that:

$$\alpha_n = D_n / E_n \qquad \text{(Expression 10)}.$$

A comparative fuel consumption calculator 10 then calculates a comparative fuel consumption $C_n$, based on the long-term average fuel consumption $E_n$ and the correction factor $\alpha_n$, such that:

$$C_n = E_n \times \alpha_n \qquad \text{(Expression 11)}.$$

If the long-term average fuel consumption E and the intermediate-term average fuel consumption D are equal ($D_n = E_n$), then $\alpha = 1$ and the comparative fuel consumption C is equal to the long-term average fuel consumption E ($C_n = E_n = B_n$). If the vehicle is then driven with even better fuel economy, the intermediate-term average fuel consumption D exceeds the long-term average fuel consumption E, so that $\alpha > 1$, with a commensurate increase in the comparative fuel consumption C, and the response to the current running condition is accelerated. If driving however is done with poor fuel economy, then $\alpha < 1$ and the value of comparative fuel consumption C decreases, so that the indicated value of comparative fuel consumption C is responsive to the current running conditions.

In the fourth embodiment, a potential cruise distance calculator 13 is responsible for residual fuel data d3 from a residual fuel sensor 12 and the long-term average fuel consumption E calculated by the fuel consumption calculator 6, to calculate a potential cruise distance Cr for the case of driving at the calculated long-term average fuel consumption $E_n$, such that:

$$Cr = d3 \times E_n \times K3 \qquad \text{(Expression 12)},$$

where K3 is a specified correction factor or a variable correction factor dependent upon d3 and $E_n$.

The potential cruise distance Cr is output to the display 20 along with the temporary fuel consumption An and the comparative fuel consumption $C_n$. The display 20 displays the potential cruise distance Cr numerically on a right-side display region 23 thereof, and displays in a left side display region 21 thereof a bar graph 210 that indicates the temporary fuel consumption A and a level pointer 211 that indicates the comparative fuel consumption C. It is alternately possible to additionally display the long-term average fuel consumption $E_n$ in the display region 21. A common graduate scale 22 is provided at a left edge of the display region 21.

It is possible in the above-described first to fourth embodiments to combine calculated elements and make a juxtaposed or selective display of the average fuel consumption B and a type of comparative fuel consumption C, and in the case of a selective display, the selection can be made automatically in accordance with running condition, or manually by the user, who selects from settable modes.

Figure 8:
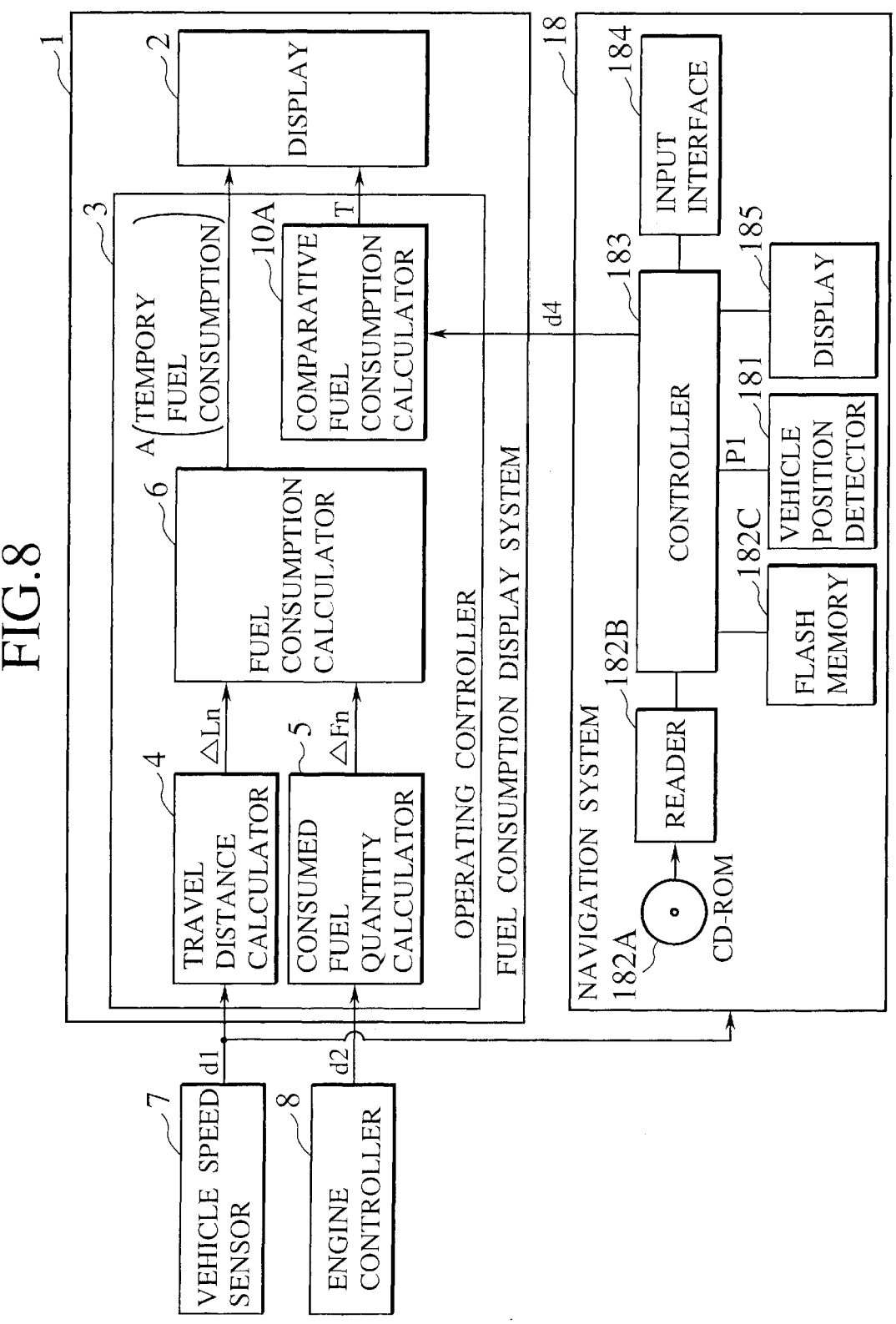
FIG. 8 is a block diagram of a fuel consumption display system for vehicles according to another embodiment of the invention.

FIG. 8 shows a fuel consumption display system 1 according to a fifth embodiment of the invention, this embodiment including a vehicle-borne car navigation system 18, which is adapted to estimate and display the fuel consumption over an expected driving course that is recognized by the car navigation system 18.

In the car navigation system 18, a vehicle position detector 181 detects a current position P1 of the vehicle as, for example, a latitude and a longitude, based on the output of a GPS sensor that receives a signal from a GPS (global positioning satellite) or on data received from gyrosensors, and provides this position as detected data. It is possible to make use of such commonly used storage media as a CD-ROM as a storage medium 182A for storing therein map information and path searching data and the like to be read by a data reading apparatus 182B and written to a dedicated flash memory 182C, along with such data as user-specified position data and driving history data. The fifth embodiment has a dedicated or shared controller 183 including such elements as a CPU, an internal memory, and peripherals, which controller 183 executes an appropriate stored program required to perform car navigation. An input interface 184 provides an interface to user data via such devices as operating buttons, a keyboard, a touch-sensitive display screen, or voice input using a microphone, a dedicated or shared display 185 implemented, for example, by liquid-crystal or CRT monitor for displaying picture information such as a map and path output from the controller 183.

The car navigation system 18 detects the position of the vehicle in which it is installed, displays a map of the current vehicle position based on the detected position, and searches for a recommended path to a user-specified destination, while receiving external information such as information on traffic congestion and displaying this also on the map, along with the estimated driving time to the destination, using a so-called VICS (Vehicle Information and Communication System) function.

In the fuel consumption display system 1 according to the fifth embodiment, an operating controller 3 receives path information, such as whether the current traveled path is a highway, a general suburban road, or an in-town road, from the car navigation system 18, and a comparative fuel consumption calculator 10A calculates a comparative fuel consumption C for a particular type of road currently being traveled. For example, if the current path is a highway, a good target fuel consumption for a highway is calculated as the comparative fuel consumption C. The comparative fuel consumption C and a temporary fuel consumption A calculated by a fuel consumption calculator 6 are displayed on a display 2.

Figure 9:
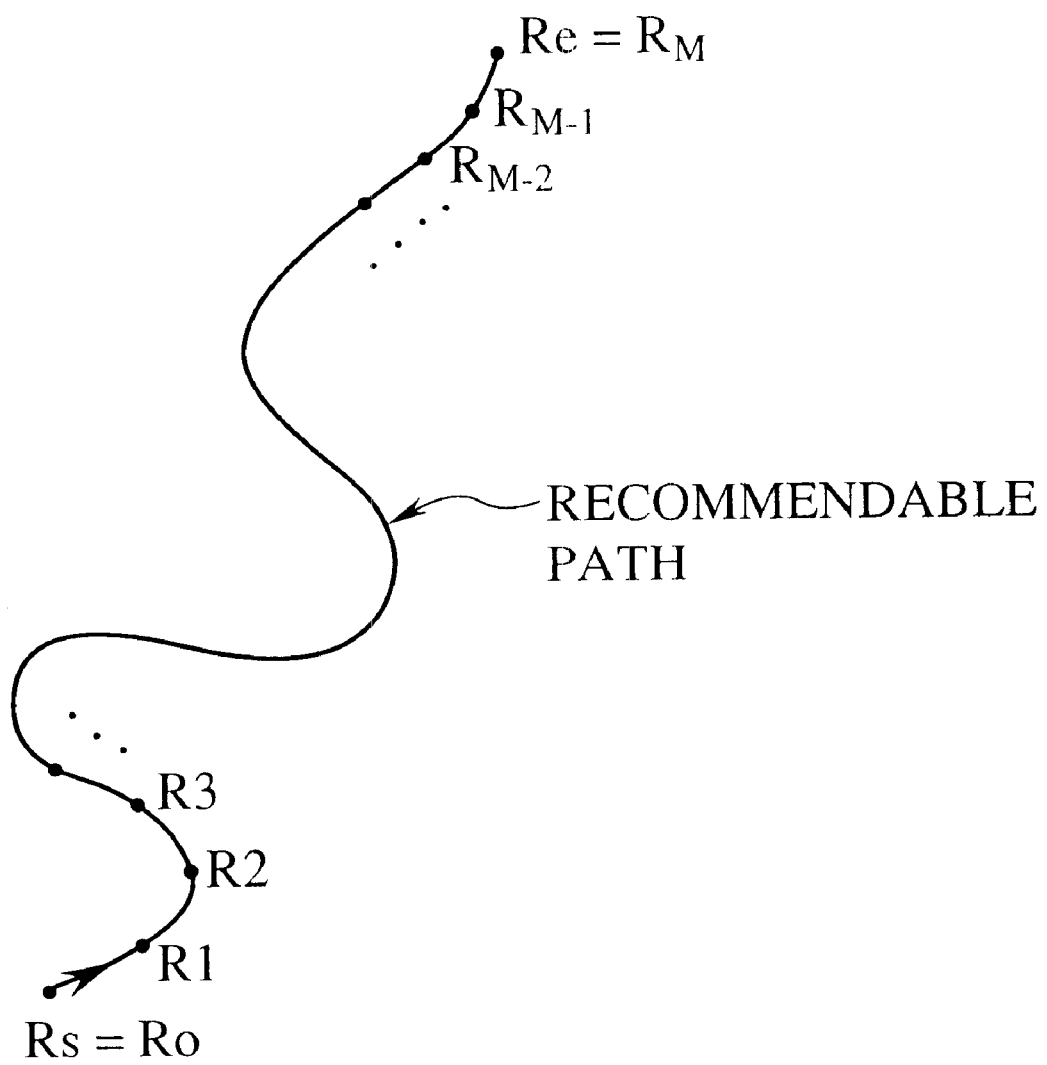
FIG. 9 is a plot of a recommended path indicated by the fuel consumption display system of FIG. 8.

Depending upon a selected mode, a comparative fuel consumption C is calculated for a respective recommendable path, for which a starting point $R_s$ and an end point $R_e$ are specified in advance and an interconnecting path therebetween is searched for, and a recommended path is displayed. As shown in FIG. 9, the recommended path is divided into a total of M sub-paths $[R(=R_s), R_1], [R_1, R_2], \ldots, [R_{M-2}, R_{M-1}], [R_{M-1}, R_M(=R_e)]$, taking into consideration VICS information such as on path type, road grade, degree of curves, standard speed, and congestion, and a target fuel consumption $T_m$ ($0 \leq m \leq M$)=$\{T_0, T_1, \ldots, T_m, \ldots, T_{M-1}$: hereinafter sometimes collectively expressed by T} is predicted and stored for a respective sub-path, to be displayed as a current comparative fuel consumption for the sub-path as the driver drives therethrough. That is, when the vehicle passes the starting point $R_0$, a predicted fuel consumption $T_1$ for the subpath $[R_0, R_1]$ up to a first intermediate point $R_1$ to be reached is displayed on the display 2 as the comparative fuel consumption, and when the vehicle passes a first intermediate point $R_1$, the display of comparative fuel consumption is switched to a predicted fuel consumption $T_2$ for the next sub-path $[R_1, R_2]$. As a further refinement, the prediction of target fuel consumption may additionally be repeated with the latest information, and the stored predicted fuel consumptions may be updated accordingly.

It is also possible within the scope of the invention to implement the fuel consumption display system 1 and the car navigation system 18 in either a more integrated manner or in a more discrete manner. For example, it is possible to build functions of the fuel consumption display system 1 into the car navigation system 18, to integrate the controller 3 with the controller 183, and use a common device as the display 185 and the display 2.

The following aspects of the above-described embodiments of the invention can be identified.

(1) The vehicular fuel consumption display system shown in FIG. 2 to FIG. 4 has a temporary fuel consumption calculator 6 that calculates the temporary fuel consumption A, based on the traveled distance $\Delta L_n$ and the quantity of fuel consumed $\Delta F_n$ within a first prescribed time period, a comparative fuel consumption calculator 10 that calculates a comparative fuel consumption, based on the traveled distance and quantity of fuel consumed in a second time period that is longer than the first time period, and a display 2, which indicates the temporary fuel consumption A and the comparative fuel consumption C on a common scale.

(2) In the fuel consumption display system shown in FIG. 1, the average fuel consumption B that is calculated from the distance traveled $\Delta L_n$ and the quantity of fuel consumed $\Delta F_n$ from the time the engine was started until the current time is used as the comparative fuel consumption.

(3) In the fuel consumption display system shown in FIG. 4, a fuel consumption obtained by correcting, using the temporary fuel consumption A, the average fuel consumption B calculated from the distance traveled $\Delta L_n$ and the quantity of fuel consumed $\Delta F_n$ from the time the engine is started is used as the comparative fuel consumption C.

(4) In the fuel consumption display system shown in FIG. 5, a fuel consumption obtained by correcting, using the load that is applied to the vehicle, the average fuel consumption B calculated from the distance traveled $\Delta L_n$ and the quantity of fuel consumed $\Delta F_n$ from the time the engine is started is used as the comparative fuel consumption C, the average fuel consumption B being corrected by the vehicle speed variation $\Delta V$ attributed to the load placed on the vehicle.

(5) The fuel consumption display system shown in FIG. 8 has means 6 for calculating a temporary fuel consumption A based on the traveled distance $\Delta L_n$ and quantity of fuel consumed $\Delta F_n$ within a prescribed period of time, means 10A for calculating a comparative fuel consumption C based on set path information d4, and a display 2 for displaying the temporary fuel consumption A and the comparative fuel consumption C on a common scale.

According to the above-noted aspects (1) to (5) of the invention, by displaying the comparative fuel consumption and the temporary fuel consumption on a common scale, a visual comparison between the two is facilitated, thereby enabling an instantaneously judgment to be made as to the acceptability of the temporary fuel consumption with respect to the comparative fuel consumption.

By using an average fuel consumption from the start of the engine to the current time that is corrected by means of either the temporary fuel consumption or the load that is applied to the engine, it is possible to display a fuel consumption as the comparative fuel consumption that is more appropriate than merely a fuel consumption that reflects the recent driving condition history.

In addition to the above effects, by calculating the comparative fuel consumption based on path information for a current set path or a future path, a comparative fuel consumption that is more appropriate to the running condition of the vehicle is displayed.

The contents of Japanese Patent Application No. 11-2168 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A fuel consumption display system for vehicles, comprising:
   an operator a fuel consumption calculator which calculates different kinds of fuel consumption in a common quantitative unit; and
   a computer operated display associated with the fuel consumption calculator which simultaneously displays by a common scale factor the different kinds of fuel consumption calculated by the operator on a common chart by difference in one of indication color and indication pattern, wherein the different kinds of fuel consumption are displayed on a bar graph and a single bar of the bar graph displays more than one kind of fuel consumption.

2. A fuel consumption display system for vehicles according to claim 1, wherein the different kinds of fuel consumption calculated by the fuel consumption calculator include a first kind of fuel consumption and a second kind of fuel consumption covering different time regions of interest.

3. A fuel consumption display system for vehicles according to claim 2, wherein the first kind of fuel consumption is a temporary fuel consumption at a current time interval, and the second kind of fuel consumption is a target fuel consumption based on a fuel consumption history over a relatively long time region of interest including the current time interval and a past time interval, and wherein the computer operated display provides a comparative display of the temporary fuel consumption and the target fuel consumption.

4. A fuel consumption display system for vehicles according to claim 3, wherein the target fuel consumption is an average fuel consumption from an engine startup to the current time interval.

5. A fuel consumption display system for vehicles according to claim 3, wherein the target fuel consumption is a corrected fuel consumption obtained by correcting the average fuel consumption over the relatively long time region of interest in dependence on a discrimination result of a discriminator having the average fuel consumption as a conditional variable therefor.

6. A fuel consumption display system for vehicles according to claim 5, wherein the discriminator has the temporary fuel consumption as a conditional variable therefor.

7. A fuel consumption display system for vehicles according to claim 5, wherein the discriminator has as a conditional variable therefor an average fuel consumption over a relatively short time region of interest including the current time interval and a past time interval.

8. A fuel consumption display system for vehicles according to claim 2, wherein the first kind of fuel consumption is a temporary fuel consumption at a current time interval, and the second kind of fuel consumption is a target fuel consumption based on a predicted fuel consumption with respect to a time region of interest including a future time interval, and wherein the display provides a comparative display of the temporary fuel consumption and the target fuel consumption.

9. A fuel consumption display system for vehicles according to claim 1, wherein the fuel consumption calculator calculates a potential cruise distance from one of the different kinds of fuel consumption and a residual fuel amount data, and wherein the computer operated display indicates the potential cruise distance.

10. A fuel consumption display system for vehicles, comprising:
    a temporary fuel consumption calculator for calculating a temporary fuel consumption based on a distance traveled and an amount of fuel consumed during a first period of time;
    a comparative fuel consumption calculator for calculating a comparative fuel consumption based on a distance traveled and an amount of fuel consumed during a second period of time longer than the first period of time; and
    a computer operated display associated with each one of the temporary fuel consumption calculator and the comparative fuel consumption calculator for indicating the temporary fuel consumption and the comparative fuel consumption by a common indication index on a common chart by difference in one of indication color and indication pattern, wherein the temporary fuel consumption and the comparative fuel consumption are displayed on a bar graph and a single bar of the bar graph displays the temporary fuel consumption and the comparative fuel consumption.

11. A fuel consumption display system for vehicles according to claim 10, wherein the comparative fuel consumption is an average fuel consumption calculated on a basis of a distance traveled and an amount of fuel consumed from an engine startup to a current time.

12. A fuel consumption display system for vehicles according to claim 10, wherein the comparative fuel consumption is a corrected average fuel consumption calculated on a basis of a distance traveled and an amount of fuel consumed from an engine startup to a current time and corrected in dependence on the temporary fuel consumption.

13. A fuel consumption display system for vehicles according to claim 10, wherein the comparative fuel consumption is a corrected average fuel consumption calculated on a basis of a distance traveled and an amount of fuel consumed from an engine startup to a current time and corrected in dependence on a load to the vehicle.

14. A fuel consumption display system for vehicles, comprising:
    a temporary fuel consumption calculator for calculating a temporary fuel consumption based on a distance traveled and an amount of fuel consumed during a prescribed period of time;
    a comparative fuel consumption calculator for calculating a comparative fuel consumption based on travel path information to be set; and
    a computer operated display associated with each one of the temporary fuel consumption calculator and the comparative fuel consumption calculator for indicating the temporary fuel consumption and the comparative fuel consumption by a common indication index on a common chart by difference in one of indication color and indication pattern, wherein the temporary fuel consumption and the comparative fuel consumption are displayed on a bar graph and a single bar of the bar graph displays the temporary fuel consumption and the comparative fuel consumption.

15. A fuel consumption display system for vehicles, comprising:
    calculation means for calculating different kinds of fuel consumption in a common quantitative unit; and
    a computer operated display means associated with the calculation means for displaying by a common scale factor the different kinds of fuel consumption calculated by the calculation means on a common chart by difference in one of indication color and indication pattern, wherein the different kinds of fuel consumption are displayed on a bar graph and a single bar of the bar graph displays more than one kind of fuel consumption.

16. A fuel consumption display method for vehicles, comprising the steps of:

calculating different kinds of fuel consumption in a common quantitative unit; and simultaneously displaying by a common scale factor the different kinds of fuel consumption calculated on a common chart by difference in one of indication color and indication pattern, wherein the different kinds of fuel consumption are displayed on a bar graph and a single bar of the bar graph displays more than one kind of fuel consumption.

* * * * *